(12) United States Patent
Komada et al.

(10) Patent No.: US 7,789,782 B2
(45) Date of Patent: Sep. 7, 2010

(54) SILENT CHAIN

(75) Inventors: Minoru Komada, Osaka (JP); Hitoshi Ohara, Osaka (JP); Takayuki Morimoto, Osaka (JP); Yoshinori Iwasaki, Osaka (JP); Syuuji Hamaguchi, Osaka (JP); Shouhei Adachi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 140 days.

(21) Appl. No.: 12/008,867

(22) Filed: Jan. 15, 2008

(65) Prior Publication Data

US 2008/0248908 A1 Oct. 9, 2008

(30) Foreign Application Priority Data

Apr. 9, 2007 (JP) ............................. 2007-101964

(51) Int. Cl.
*F16G 1/24* (2006.01)

(52) U.S. Cl. ..................................................... 474/206

(58) Field of Classification Search ................. 474/217, 474/231, 230, 202, 206, 212–213, 232
See application file for complete search history.

(56) References Cited

U.S. PATENT DOCUMENTS

| | | | |
|---|---|---|---|
| 953,429 A * | 3/1910 | Morse ......................... | 474/217 |
| 958,676 A * | 5/1910 | Dodge ......................... | 474/213 |
| 1,586,857 A | 6/1926 | Stiansen | |
| 3,595,098 A * | 7/1971 | Kumakichi .................. | 474/206 |
| 4,250,764 A * | 2/1981 | Grant .......................... | 474/207 |
| 5,921,881 A * | 7/1999 | Nakamura ................... | 474/217 |
| 6,272,835 B1 | 8/2001 | Horie et al. | |
| 6,450,911 B2 * | 9/2002 | Saitou ......................... | 474/213 |
| 7,048,665 B2 * | 5/2006 | Ledvina et al. ............. | 474/212 |
| 2001/0006918 A1 * | 7/2001 | Saitou ......................... | 474/212 |
| 2003/0233821 A1 | 12/2003 | Matsuda | |
| 2005/0070389 A1 | 3/2005 | Morishige | |
| 2006/0105872 A1 | 5/2006 | Tohara et al. | |
| 2007/0197332 A1 | 8/2007 | Junig et al. | |

FOREIGN PATENT DOCUMENTS

| | | |
|---|---|---|
| JP | 2000-304105 | 11/2000 |
| JP | 2001-124150 | 5/2001 |
| JP | 2006-144852 | 6/2006 |
| WO | 2007076761 A1 | 7/2007 |

\* cited by examiner

*Primary Examiner*—Robert A Siconolfi
*Assistant Examiner*—Anna Momper
(74) *Attorney, Agent, or Firm*—Howson & Howson LLP (57) ABSTRACT

In a silent chain comprising interleaved and relatively pivotable rows of link plates, protrusions formed in the link plates contact relatively pivotable link plates in adjacent rows so that the area of contact is reduced. The protrusions can be annular, or they can be in the form of arcs that are of a size and position such that the arcuate protrusions of each plate do not interfere with the arcuate protrusions of an adjacent plate as the chain bends during use. The plates can have rectangular protrusions, or arcuate protrusions each consisting of an arc-shaped collection of dot-shaped protrusions.

5 Claims, 11 Drawing Sheets

SILENT CHAIN

CROSS-REFERENCE TO RELATED APPLICATION

This application claims priority from Japanese patent application 2007-101964, filed Apr. 9, 2007. The disclosure of Japanese application 2007-101964 is here incorporated by reference.

FIELD OF THE INVENTION

This invention relates to a silent chain used in a transmission in which the chain is engaged with sprockets to transmit power. It relates more specifically to a silent chain in which protrusions are provided on link plate surfaces to reduce the area of contact with adjacent link plates and thereby reduce bending resistance.

BACKGROUND OF THE INVENTION

A silent chain typically comprises link plates each having a pair of pin holes and a pair of teeth. The link plates are disposed in interleaved widthwise rows along the length of the chain, and the rows are flexibly connected to one another by connecting pins extending through the pin holes, whereby the link plates of each row are pivotable relative to the link plates of an adjacent row interleaved therewith. The plates can be interleaved individually or in groups, as described in U.S. Pat. No. 6,272,835 and United States patent publication 2006/0105872.

It is also known to provide a silent chain with springs incorporated between link plates arranged in the chain width direction as described in Japanese Laid-Open Patent Publication No. 2000-304105.

Figure 17:
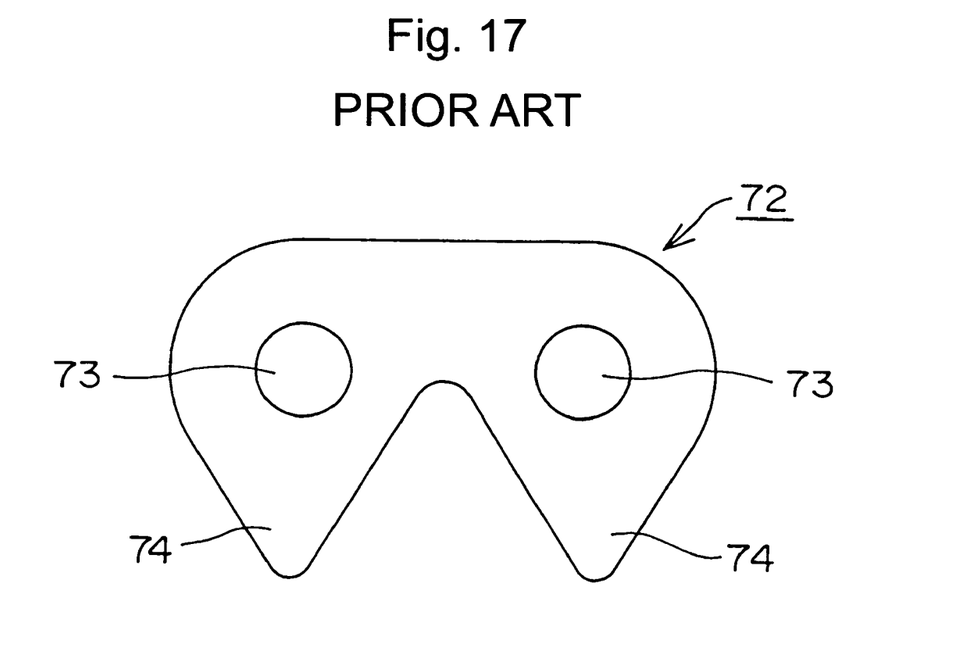
FIG. 17 is an elevational view of a conventional link plate.
Figure 18:
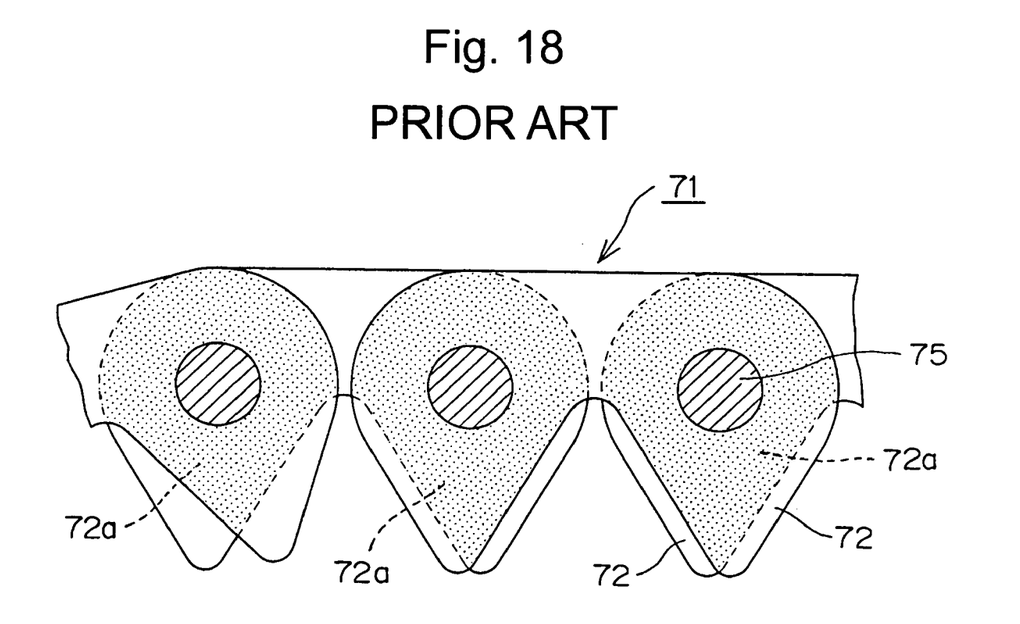
FIG. 18 is an elevational view, partly in section, showing a portion of partial front view showing a main portion of a conventional silent chain.

As shown in FIGS. 17 and 18, a silent chain 71 is formed such that a number of link plates, each having a pair of pin holes and a pair of teeth, are disposed in interleaved relationship in the longitudinal direction of the chain and flexibly connected to by connecting pins 75. The surfaces of the link plates 72 overlap at the locations of the connecting pins 75, and the overlapping portions of the plate surfaces, indicated by the hatched areas in FIG. 18 becomes flat sliding contact surface areas 72a.

In the conventional silent chain, the sliding contact surfaces are relatively large, and there is a relatively large frictional resistance as the chain bends during use. When the adjacent link plates are relatively pivoted using the connecting pin as the central bending axis of the chain, since the contact area changes as the interleaved rows of link plates pivot relative to each other, the frictional resistance changes. The contact position and the size of the contact area of the link plates also change momentarily due to generation of minute warp and unevenness on the plate surfaces. As a result, the bending resistance due to friction changes and the bending resistance in the silent chain cannot be stabilized. The problem is particularly acute in the case of a silent chain having a spring incorporated between the link plates.

Accordingly, an object of the invention is to solve the prior art problems and to provide a silent chain in which frictional resistance on bending of the chain, and bending resistance due to this frictional resistance, can be decreased and at the same time stabilization of the bending resistance can be obtained.

SUMMARY OF THE INVENTION

A silent chain according to the invention comprises link plates each having a pair of pin holes and a pair of teeth, the link plates being disposed in interleaved widthwise rows along the length of the chain, the rows being flexibly connected to one another by connecting pins extending through said the pin holes, whereby the link plates of each row are pivotable relative to the link plates of an adjacent row interleaved therewith. In certain embodiments of the invention, at least one link plate in one widthwise row includes an annular protrusion coaxial with a pin hole therein, the protrusion being in contact with an adjacent link plate in a row of link plates interleaved with, and pivotable relative, to the one widthwise row. In other embodiments protrusions are provided on the opposed plate surfaces of link plates which are relatively pivotable. The protrusions, which can be arc-shaped, rectangular, or in the form of an arcuate collection of dot-shaped protrusions, are of a size and position such that they do not interfere with each other when the chain bends during use.

In the case of annular protrusions, tops of the annular protrusions come into contact with the tops of other annular protrusions or with opposed plate surfaces. The contact area between abutting surfaces are small in comparison to the contact areas in the case of a conventional silent chain. As a result, the frictional resistance as the chain bends during use is reduced, and the bending resistance of the chain is stabilized.

Furthermore, an annular space is formed between each connecting pin and the annular protrusion. This space can serve as an oil reservoir, so that the frictional resistance to bending of the chain can be further decreased and, at the same time, bending resistance can be stabilized. Since oil is also supplied from the oil reservoir to the area of contact between the pin hole and the connecting pin, wear elongation of the chain can be suppressed and a long life of the chain can be realized.

Where annular protrusions are provided on both sides of each plate, the annular protrusions abut one another and it is unnecessary to ascertain that a link plate is arranged in the proper direction. Therefore, manufacture of the silent chain can be simplified.

When the link plate surfaces are provided with protrusions which contact opposed link plate surfaces but do not interfere with each other when the chain bends during use, the contact area between abutting surfaces of adjacent link plates can be decreased, and bending resistance in the chain can be stabilized.

When the protrusions on the link plates are arc-shaped, rectangular or collected dot-shaped protrusions, the contact area between abutting surfaces of adjacent link plates is decreased. As a result frictional resistance on bending the chain can be decreased, and at the same time, bending resistance due to frictional resistance can be stabilized.

DETAILED DESCRIPTION OF THE PREFERRED EMBODIMENTS

Referring to FIGS. 1 to 4, in a silent chain 1, link plates 2, each having a pair of pin holes 3 and a pair of teeth 4, are disposed in interleaved widthwise rows and connected to one another by connecting pins 7. When the chain 1 bends, adjacent link plates 2 pivot relative to each other about the axis of a connecting pin 7.

Figure 1:
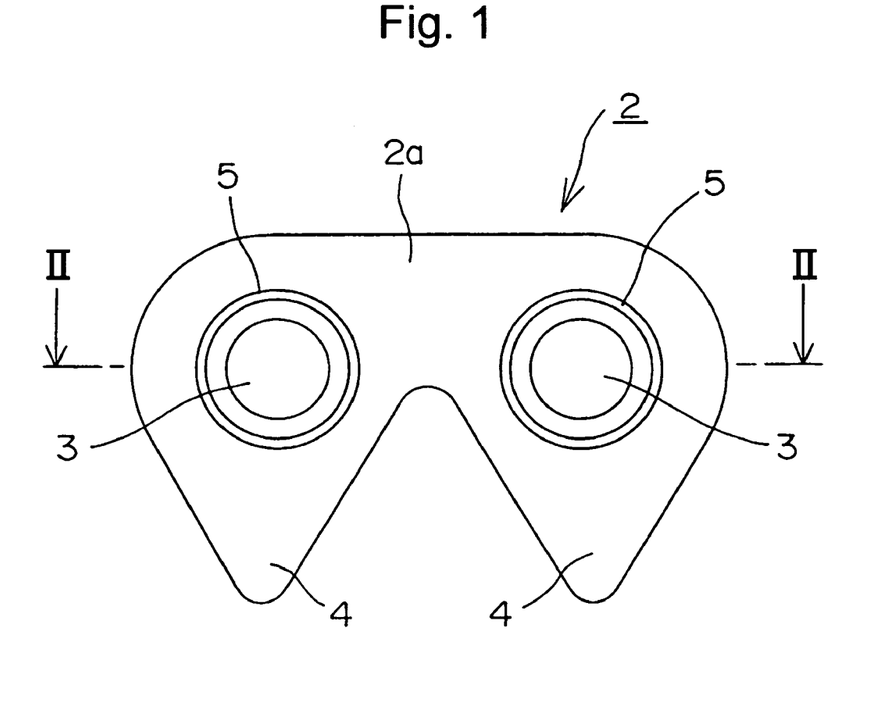
FIG. 1 is an elevational view of a link plate used in a silent chain according to a first embodiment of the invention.
Figure 2:
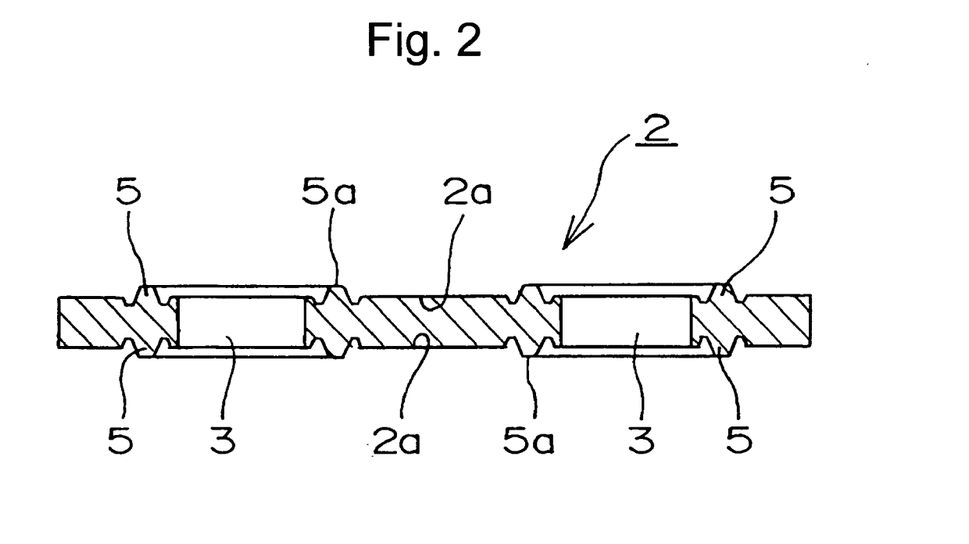
FIG. 2 is a cross-sectional view taken on plane II-II in FIG. 1.
Figure 3:
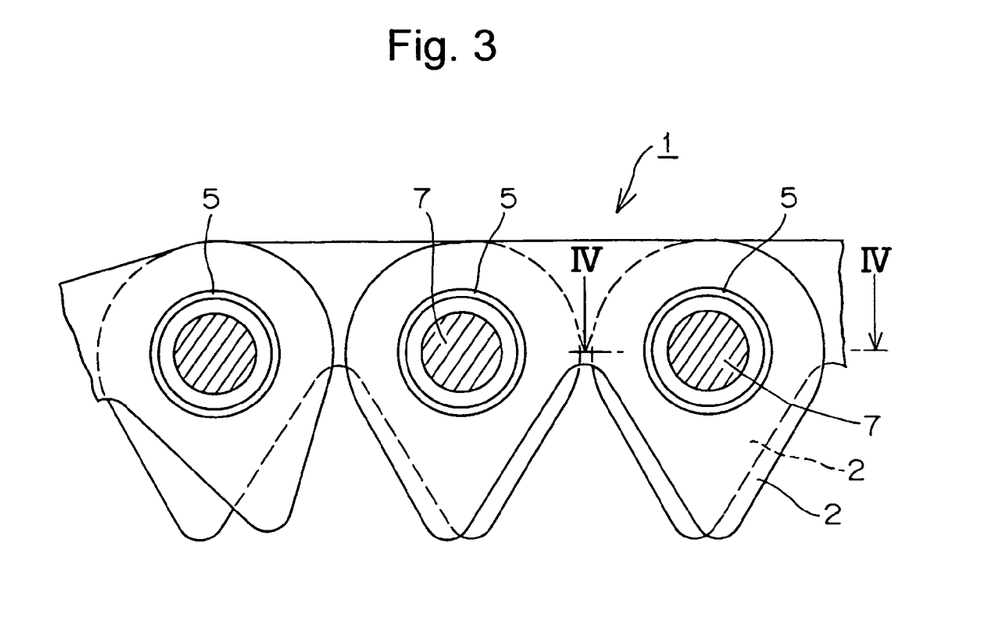
FIG. 3 is an elevational view, partly in section, showing a portion of the silent chain according to the first embodiment of the invention.
Figure 4:
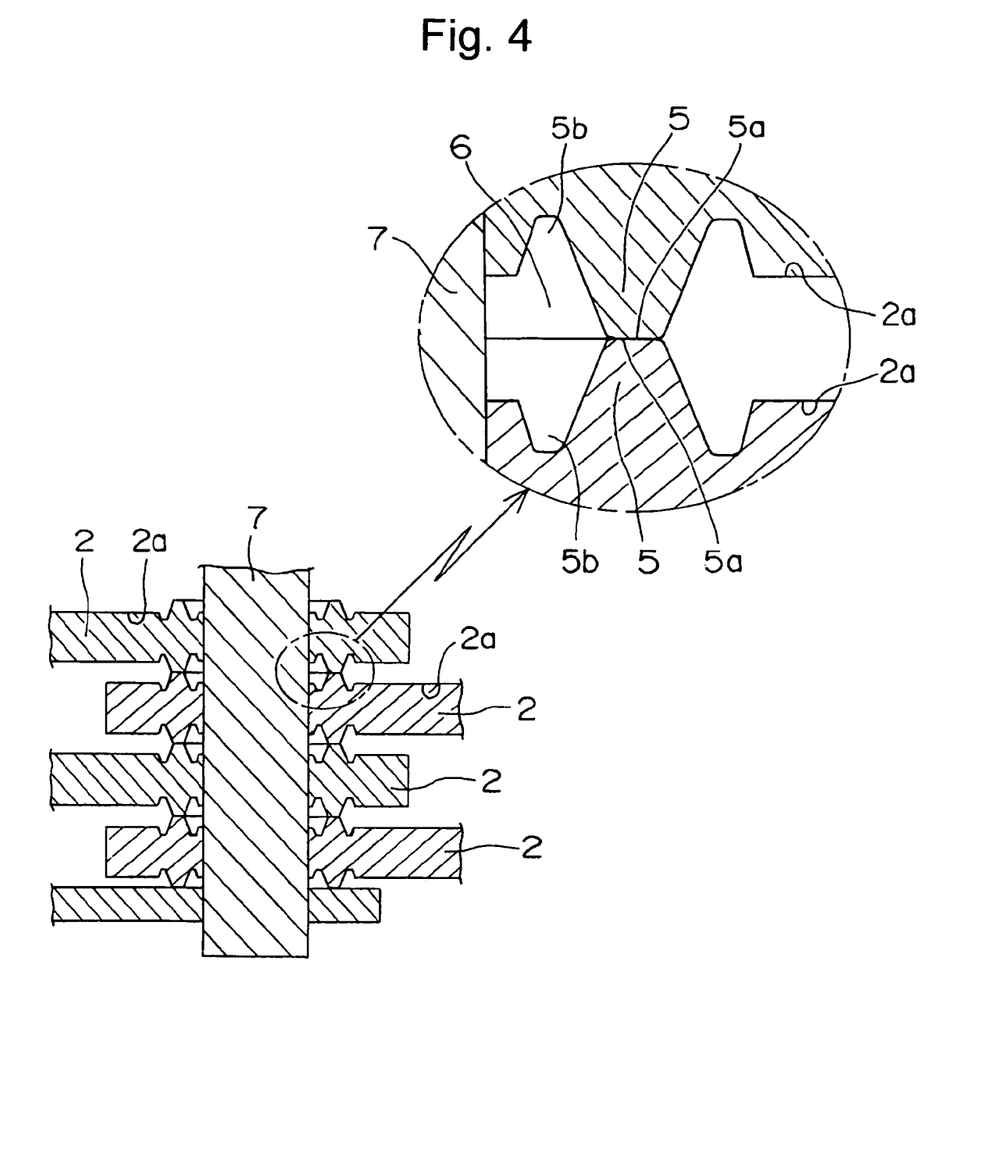
FIG. 4 is a cross-sectional view taken on plane IV-IV in FIG. 3, and includes an enlarged auxiliary view.

As shown in FIGS. 1 and 2, annular protrusions 5 are formed on both faces 2a of the link plate 2, and each protrusion has an annular recess 5b adjacent its inner face as well as a similar annular recess adjacent its outer face. Both annular protrusions are coaxial with a pin hole 3, and have the same inner diameter, which is larger than the diameter of the pin hole. As shown in FIG. 4, in a silent chain composed of plural link plates 2, plate surfaces 2a of adjacent link plates 2 are in opposed relationship, and the ends of the opposed annular protrusions 5 come into sliding contact with each other. An annular space 6, which can serve as an oil reservoir, is formed between the connecting pin 7 and the mutually contacting annular protrusions, and the size of the annular space is increased by virtue of the annular recesses 5b.

Although in the embodiment shown, the annular protrusions 5 are provided in both face and back plate surfaces 2a of the link plate 2, an annular protrusion 5 may be formed on only one of surfaces 2a of a plate, while the other plate surface 2a may be flat. In this case, the link plates 2 should be assembled in such a way that each flat plate surface is opposed to a plate surface having a protrusion. Here, an oil reservoir is also formed between the connecting pin 7 and an annular protrusion 5.

In forming an annular protrusion 5, two annular convex portions of a jig abut the link plate surface 2a on both sides of the position where the annular protrusion 5 is to be formed. Thus, annular protrusion 5 is formed in a space between the annular convex portions of the jig.

Figure 5A:
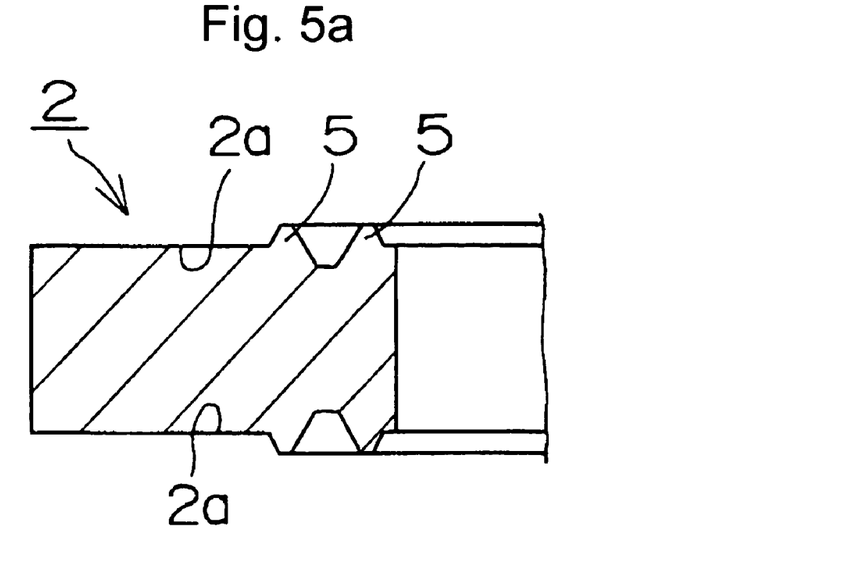
FIG. 5(a) is a cross-sectional view showing a portion of a link plate in a modified version of the first embodiment.
Figure 5B:
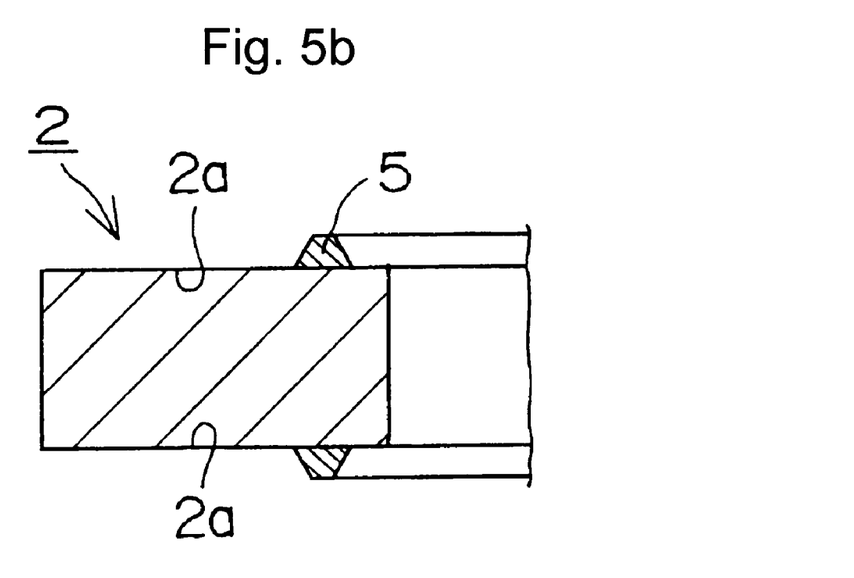
FIG. 5(B) is a cross-sectional view showing a portion of a link plate in another modified version of the first embodiment.

In a modified version of the first embodiment illustrated in FIG. 5a, a pair of radially spaced, coaxial, annular protrusions 5 may be provided on plate surface 2a. In this case, the annular protrusions are formed by pressing a jig having three annular convex portions against the link plate 2. In still another modification as shown in FIG. 5b, the annular protrusion may be built-up.

In a silent chain incorporating the above-described link plates, adjacent link plates 2 come into contact with each other at the tops of their protrusions, or the top 5a of an annular protrusion comes into contact with a plate surface 2a. In either case, the contact area at which adjacent link plates 2 abut each other is substantially less than the contact area in the case of a conventional silent chain. As a result, the frictional resistance to bending of the chain is decreased, and at the same time, the bending resistance of the can be stabilized. Furthermore, since the adjacent plates come into contact with each other at the tops 5a of the protrusions or the top 5a of a protrusion comes into contact with a plate surface 2a, a parallel relationship between the adjacent link plates 2 can be maintained.

Because the annular protrusions, in cooperation with the connecting pins, form annular spaces, e.g. space 6, that serve as oil reservoirs, the frictional resistance to bending of the chain is decreased, and, at the same time, bending resistance can be stabilized. Furthermore, since the reservoirs supply oil to the interfaces between the pin holes 3 and the connecting pins 7, wear elongation of the chain is suppressed, and the life of the chain is extended.

In the case where annular protrusions 5 are provided on both plate surfaces 2a of each link plate 2, it is unnecessary to distinguish between front and back sides of the link plates during assembly of the chain. The tops 5a of the annular protrusions 5 necessarily abut one another regardless of the direction in which any particular link plate faces. Consequently manufacture of the chain can be simplified.

Figure 6:
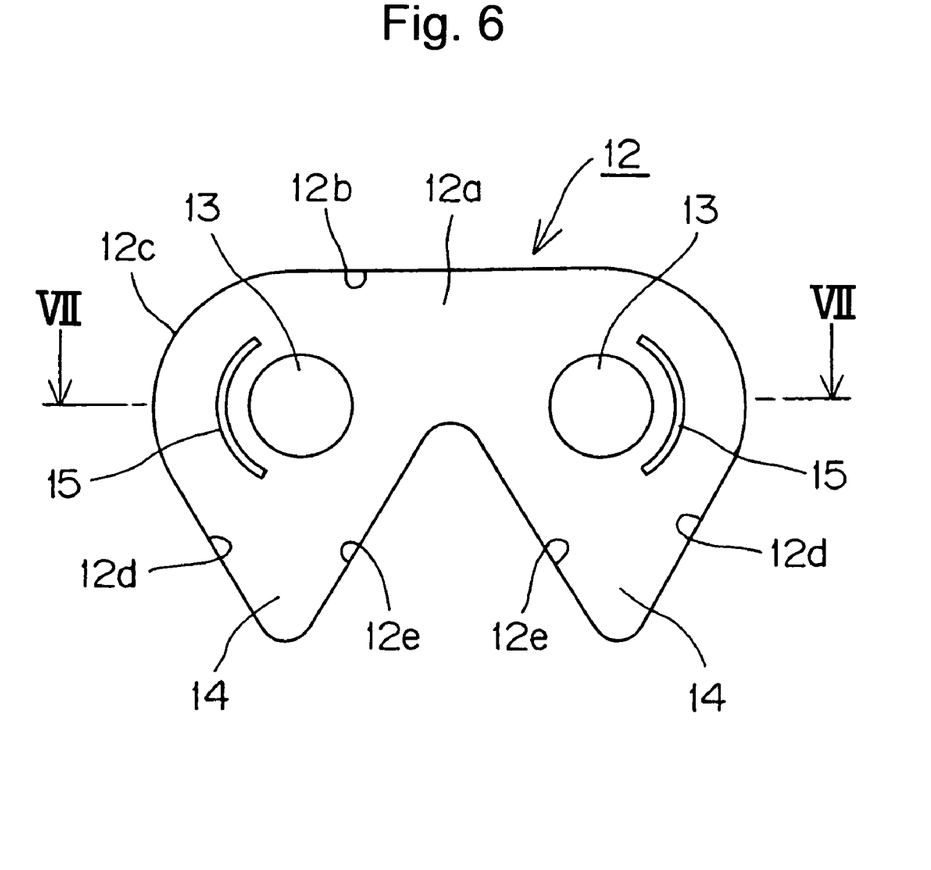
FIG. 6 is an elevational view of a link plate used in a silent chain according to a second embodiment of the invention.
Figure 7:
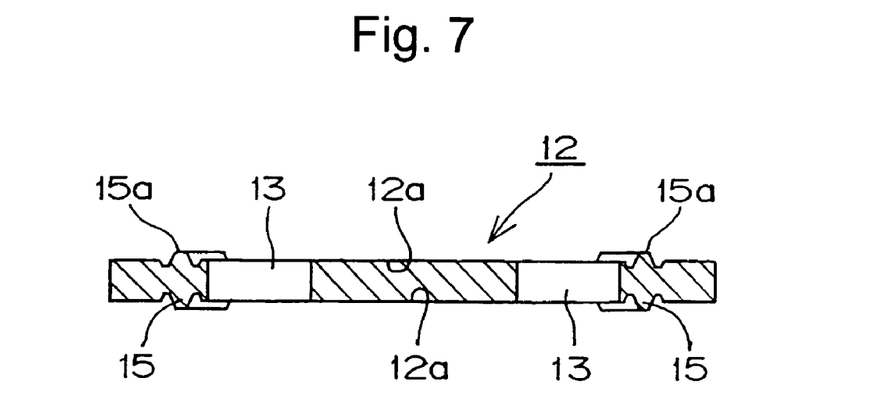
FIG. 7 is a cross-sectional view taken on plane VII-VII in FIG. 6.

In a second embodiment of the invention, the link plates 12 of which are shown in FIGS. 6 and 7, the link plates, each having a pair of pin holes 13, and a pair of teeth 14, are disposed in interleaved widthwise rows, connected pivotably to one another by connecting pins (not shown) as in the first embodiment.

The link plate 12 has opposite plate surfaces 12a, a back surface 12b, shoulders 12c, outer flanks 12d and inner flanks 12e. Arc-shaped protrusions 15, coaxial with the pin holes are provided on both surfaces 12a of each of the link plates 12. The arc subtends an angle substantially less than 120 degrees, so that the arc length is substantially less than the length of a semicircle having the same radius. The arc-shaped protrusions 15 are provided adjacent the upper ends of outer flanks 12d and between pin holes 13 and the shoulders 12c. Because the length of each arc-shaped protrusion is substantially less than that the length of a corresponding semicircle, the protrusions do not interfere with one another when the chain bends during its travel.

A top 15a of an arc-shaped protrusion of one link plate comes into contact with a surface 12a of an adjacent link plate 12. Consequently, the contact area between abutting surfaces of the adjacent link plates 12 is significantly less than the contact area in the case of a conventional silent chain. As in the first embodiment, frictional resistance is decreased, bending resistance is stabilized, and a parallel relationship between adjacent link plates is maintained.

Figure 8:
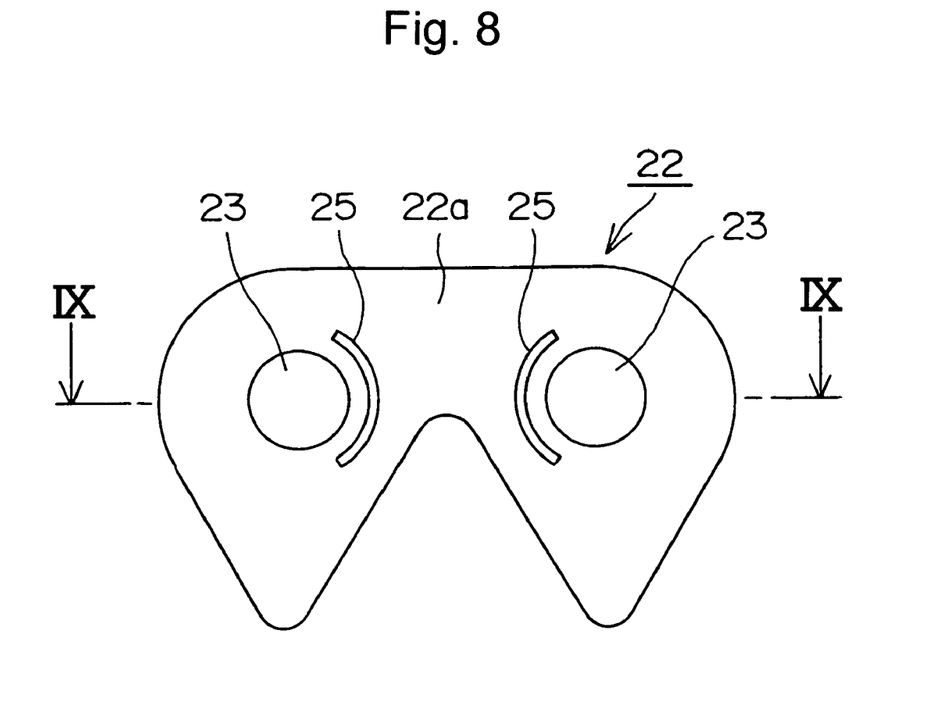
FIG. 8 is an elevational view of a link plate used in a silent chain according to a third embodiment of the invention.
Figure 9:
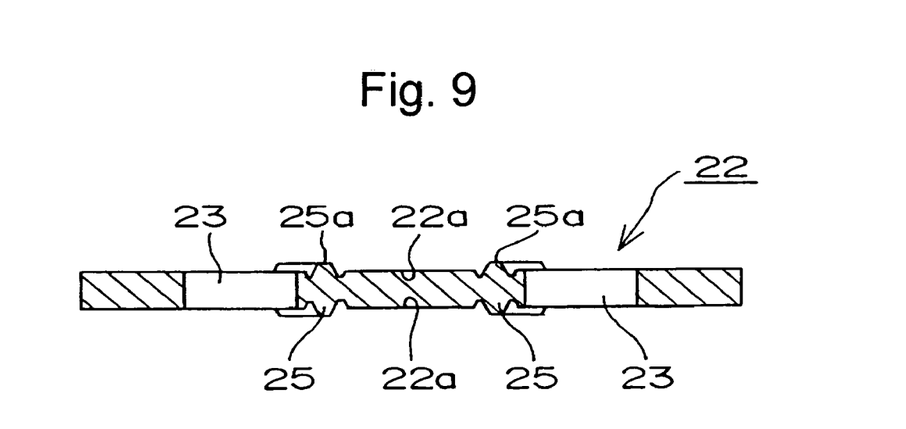
FIG. 9 is a cross-sectional view taken on plane IX-IX in FIG. 8.
Figure 10:
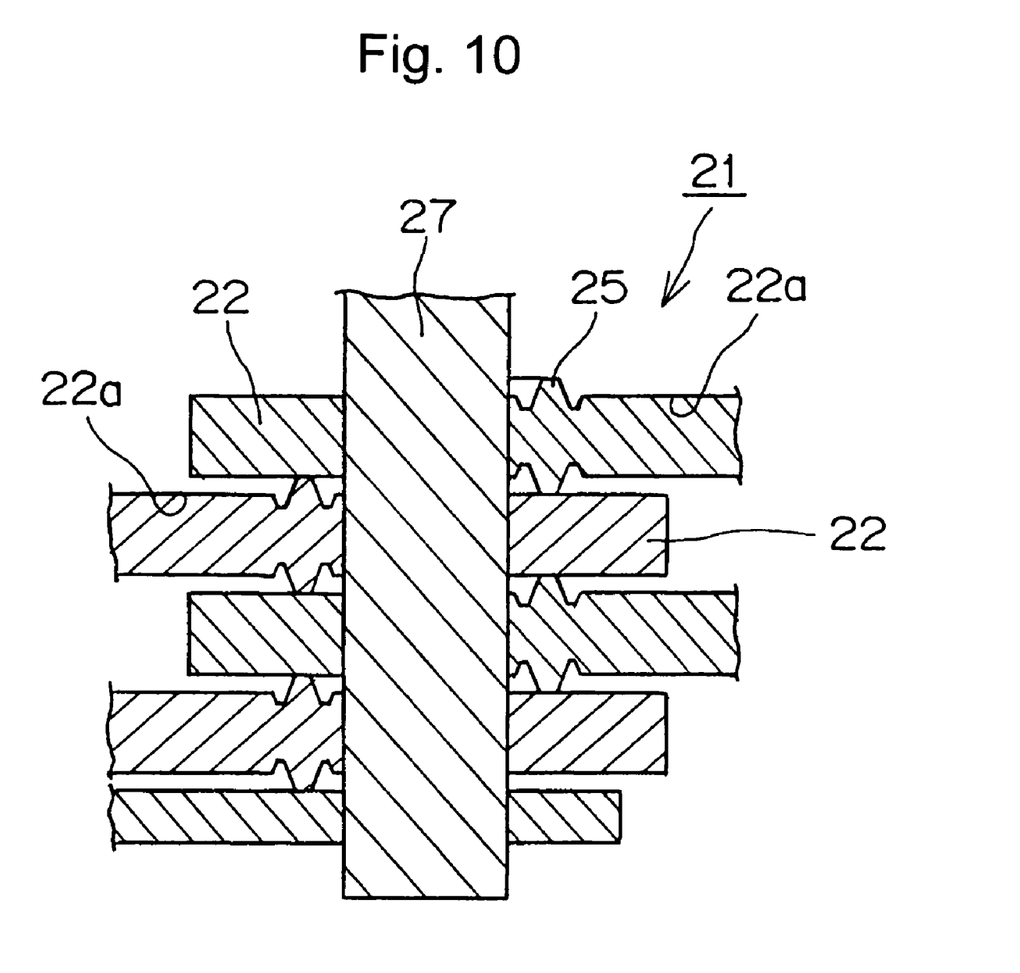
FIG. 10 is a cross-sectional view of a portion of a silent chain according to the third embodiment of the invention.

A third embodiment of the invention, illustrated in FIGS. 8 to 10 is similar to the second embodiment except that the arc-shaped protrusions on each link plate are disposed adjacent the inner flanks and between the pin holes. Thus, in the silent chain 21, a link plate 22 is provided with arc-shaped protrusions 25, each arc having a length less than that of a corresponding semicircle having the same radius. The protrusions 25 are located on both plate surfaces 22a. They are disposed on the insides relative to pin holes 23, and are coaxial with the pin holes. Because of the lengths and positions of the protrusions 25 on plate surfaces 22a, the protrusion on one plate does not interfere with a corresponding protrusion on an adjacent plate.

As in the second embodiment, in the third embodiment, a top 25a of an arc-shaped protrusion of one link plate comes into contact with a surface 22a of an adjacent link plate 22. Consequently, the contact area between abutting surfaces of the adjacent link plates 22 is significantly less than the contact area in the case of a conventional silent chain. As in the first and second embodiments, frictional resistance is decreased, bending resistance is stabilized, and a parallel relationship between adjacent link plates is maintained.

The annular protrusions 15 and 25 of the second and third embodiments are formed using a jig having convex portions that abut the plate surfaces on both sides of the positions where the arc-shaped protrusions 15 and 25 are to be formed, so that the arc-shaped protrusions 15 and 25 are formed in a space between the convex portions of the jig.

Figure 11:
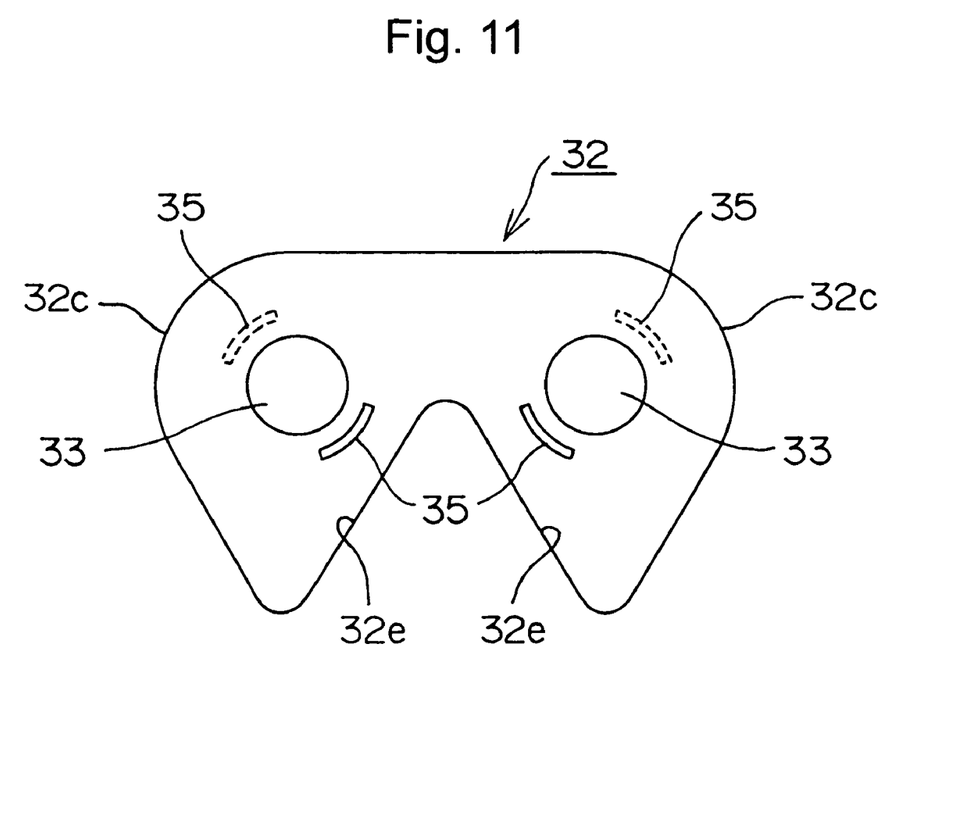
FIG. 11 is an elevational view of a link plate used in a silent chain according to a fourth embodiment of the invention.
Figure 12:
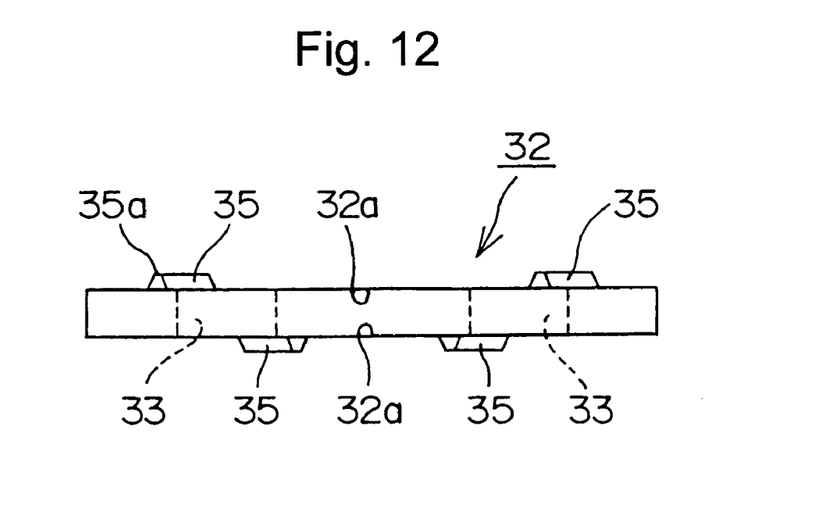
FIG. 12 is a plan view of the link plate shown in FIG. 11.

In the fourth embodiment of the invention, illustrated in FIGS. 11 and 12, link plate 32 have arc-shaped protrusions on opposite sides of each pin hole 33, respectively adjacent a shoulder 32c and adjacent an inner tooth flank 32e. The arc-shaped protrusions 35 are symmetrical relative to the center of a pin hole 33 and in coaxial relationship with the pin hole. These protrusions are provided respectively on opposite plate surfaces 12a. Each of these arc-shaped protrusions has a length less than that of a semicircle having the same radius. The lengths and positions of the arc-shaped protrusions are such that they do not interfere with each other when the chain bends during use.

As in the second and third embodiments, in the fourth embodiment, a top 35a of an arc-shaped protrusion of one link plate comes into contact with a surface 32a of an adjacent link plate 32. Consequently, the contact area between abutting surfaces of the adjacent link plates 32 is significantly less than the contact area in the case of a conventional silent chain. As in the second and third embodiments, frictional resistance is decreased, bending resistance is stabilized, and a parallel relationship between adjacent link plates is maintained.

Figure 13:
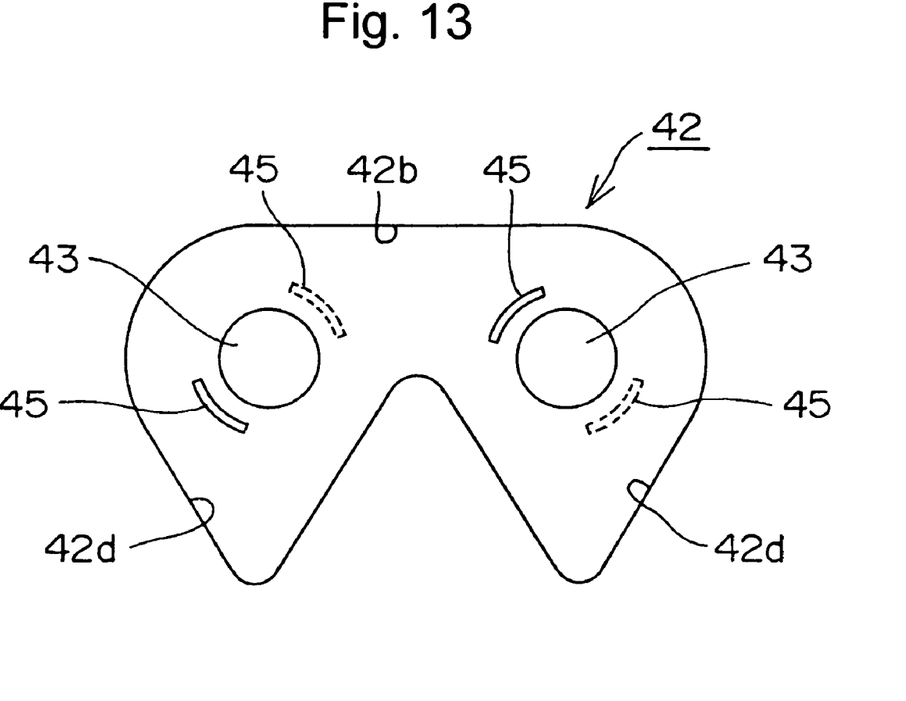
FIG. 13 is an elevational view of a link plate used in a silent chain according to a fifth embodiment of the invention.
Figure 14:
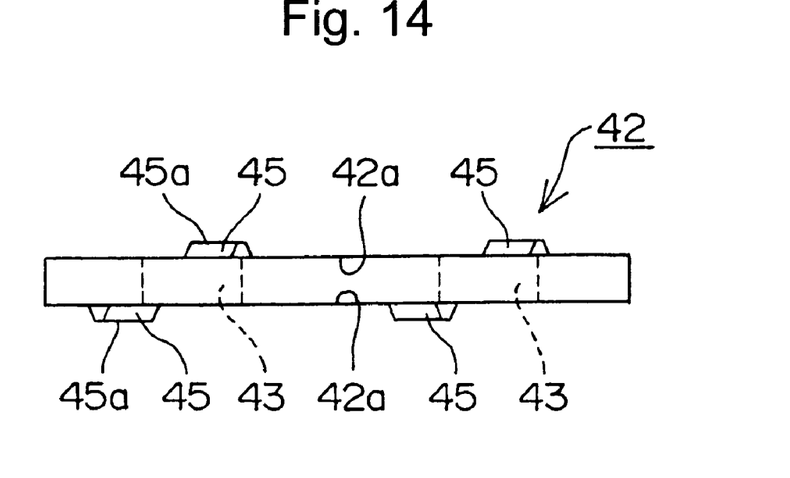
FIG. 14 is a plan view of the link plate shown in FIG. 13.

The fifth embodiment of the invention, shown in FIGS. 13 and 14, is similar to the fourth embodiment except that the arc-shaped protrusion 45 adjacent the inner side of a pin hole 43 is located near the back 42b of the link plate and the arc-shaped protrusion on the opposite side of the same pin hole 43 is located adjacent an outer tooth flank 42d. These two protrusions are formed on opposite sides 42a of the link plate as shown in FIG. 14.

The arc-shaped protrusions 45 are symmetrical relative to the center of a pin hole 43, and in coaxial relationship with the pin hole. Each of these arc-shaped protrusions has a length less than that of a semicircle having the same radius, and the lengths and positions of the arc-shaped protrusions are such that they do not interfere with each other when the chain bends during use.

As in the second, third and fourth embodiments, in the fifth embodiment, a top 45a of an arc-shaped protrusion of one link plate comes into contact with a surface 42a of an adjacent link plate 42. Consequently, the contact area between abutting surfaces of the adjacent link plates 42 is significantly less than the contact area in the case of a conventional silent chain. As in the second, third and fourth embodiments, frictional resistance is decreased, bending resistance is stabilized, and a parallel relationship between adjacent link plates is maintained.

The arc-shaped protrusions 35 and 45 of the fourth and fifth embodiments, are formed by jigs having convex portions, each of which abuts a surface of the plate on the side opposite to the side on which the protrusion is to be formed. Thus, an arc-shaped protrusion formed by a convex portion of a jig is formed on the side of the plate opposite to the side abutted by that convex portion of the jig.

Figure 15:
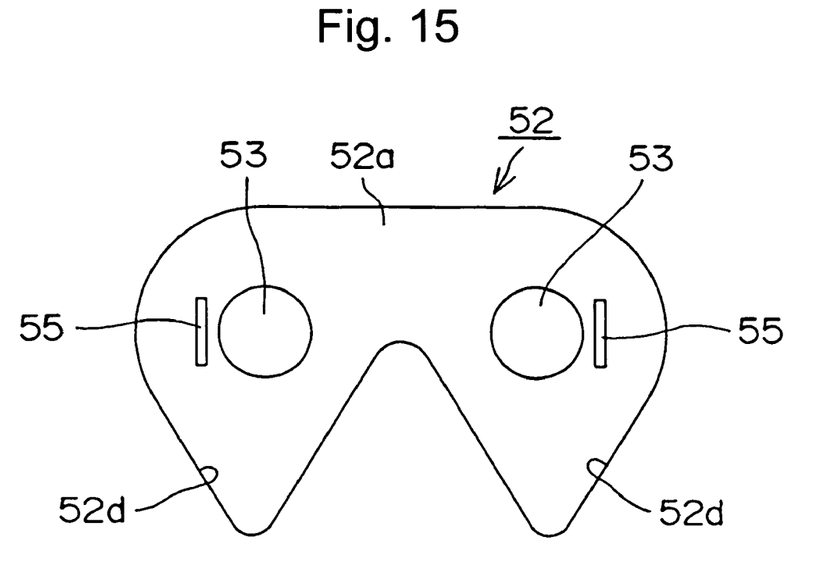
FIG. 15 is an elevational view of a link plate used in a silent chain according to a sixth embodiment of the invention.

In the sixth embodiment of the invention, illustrated in FIG. 15 short rectangular protrusions 55 are provided on the link plate 52 on the outer sides of pin holes 53 on face 52a of the link plates and on the opposite face (not shown). The rectangular protrusions 55 do not interfere with one another when the chain bends during use.

The top of each rectangular protrusion 55 comes into contact with a surface 52a of an adjacent link plate 52. The contact area is relatively small compared to the contact area in a conventional silent chain. As a result, frictional resistance is decreased, and the bending resistance of the chain can be stabilized.

Figure 16:
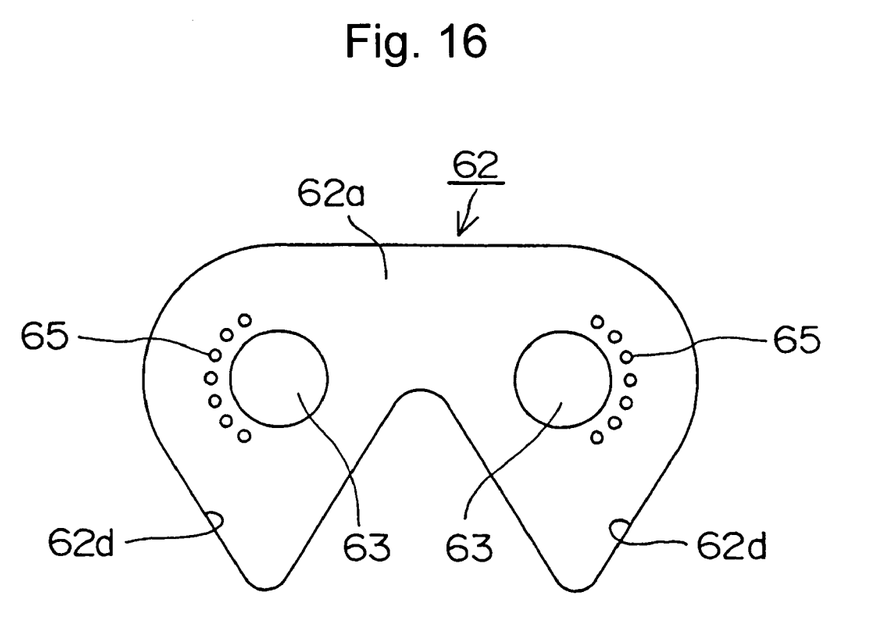
FIG. 16 is an elevational view of a link plate used in a silent chain according to a seventh embodiment of the invention.

In the seventh embodiment of the invention, illustrated in FIG. 16, dot-shaped protrusions 65 are arranged in an arc coaxial with a pin hole 63. The arcuately arrange protrusions are disposed on the outer sides of the pin holes 63, i.e., adjacent the outer tooth flanks 62d, on both opposite surfaces 62a of the plate 62. When the chain bends during use, the lengths and positions of the arcs of dot-shaped protrusions 65 on the overlapping plate surfaces 62a of adjacent plates in the chain are such that the protrusions do not interfere with one another.

As in the previously described embodiments, the tops of the protrusions of one link plate 62 come into contact with a surface 62a of an adjacent link plate 62. Consequently, the contact area between abutting surfaces of the adjacent link plates 62 is significantly less than the contact area in the case of a conventional silent chain. Frictional resistance is decreased, bending resistance is stabilized, and a parallel relationship between adjacent link plates is maintained.

In all of the embodiments of the silent chain described above, the link plates are interleaved individually. The invention, however, is applicable to silent chains in which the link plates are grouped as in United States Patent Publication 2006/0105872. In such a case, the protrusions may be provided only on the opposed link plates that are relatively pivoted. The silent chain of the invention may utilize rocker pins as connecting pins instead of round pins. The invention is also applicable to double-sided silent chains, in which sprocket-engaging teeth are provided on a back (or outside) of the chain as well as on the front or inside of the chain.

What is claimed is:

1. A silent chain comprising link plates each having a pair of pin holes and a pair of teeth, the link plates being disposed in interleaved widthwise rows along the length of the chain, the rows being flexibly connected to one another by connecting pins extending through said pin holes, whereby the link plates of each row are pivotable relative to the link plates of an adjacent row interleaved therewith, wherein at least one link plate in one widthwise row has a side surface facing a side surface of an adjacent link plate in a row of link plates interleaved with, and pivotable relative to, the link plates of said widthwise row, and includes an annular protrusion coaxial with a pin hole therein, the protrusion being in contact with said adjacent link plate, and an annular recess in said side surface of said at least one link plate, said annular recess being coaxial with and adjacent said annular protrusion, in which said annular recess is located radially inward with respect to said annular protrusion, in which said side surface of said adjacent link plate also includes an annular protrusion coaxial with a pin hole therein and an annular recess adjacent, and coaxial and radially inward with respect to, said annular protrusion of said adjacent link plate, said annular protrusions being coaxial with and in contact with each other, and said annular recesses together forming an annular oil reservoir.

2. A silent chain according to claim 1, in which said at least one link plate has another annular recess adjacent and coaxial with the annular protrusion on said at least one link plate, said another annular recess being radially outward of the annular protrusion on said at least one link plate.

3. A silent chain according to claim 2, in which said annular protrusion on said at least one link plate has radially spaced outer and inner sides extending into said one of said recesses in said at least one link plate and into said other of said recesses in said at least one link plate, respectively.

4. A silent chain comprising link plates each having a pair of pin holes and a pair of teeth, the link plates being disposed in interleaved widthwise rows along the length of the chain, the rows being flexibly connected to one another by connecting pins extending through said pin holes, whereby the link plates of each row are pivotable relative to the link plates of an adjacent row interleaved therewith, wherein protrusions are provided on the opposed plate surfaces of said link plates which are relatively pivotable, said protrusions being of a size and position such that they do not interfere with each other when the chain bends during use, and at least one of said plate surfaces having a recess formed therein adjacent the protrusion provided thereon, in which each said protrusion is an arc-shaped protrusion having a length less than that of a semicircle having an equivalent radius, and in which a first arc-shaped recess is formed in each plate adjacent, coaxial with, and radially outward from each arc-shaped protrusion provided thereon, and a second arc-shaped recess is formed in each plate adjacent, coaxial with, and radially inward from each arc-shaped protrusion provided thereon.

5. A silent chain according to claim 4, in which each said arc-shaped protrusion has radially spaced outer and inner sides extending respectively into adjacent first and second arc-shaped recesses.

* * * * *